(12) United States Patent
Yumoto et al.

(10) Patent No.: US 9,779,674 B2
(45) Date of Patent: Oct. 3, 2017

(54) TOUCH PANEL SYSTEM

(71) Applicant: SHARP KABUSHIKI KAISHA, Osaka-shi, Osaka (JP)

(72) Inventors: Manabu Yumoto, Osaka (JP); Shunsuke Nagasawa, Osaka (JP); Hitoshi Azuma, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/441,092

(22) PCT Filed: Nov. 7, 2013

(86) PCT No.: PCT/JP2013/080067
§ 371 (c)(1),
(2) Date: May 6, 2015

(87) PCT Pub. No.: WO2014/073586
PCT Pub. Date: May 15, 2014

(65) Prior Publication Data
US 2015/0302810 A1  Oct. 22, 2015

(30) Foreign Application Priority Data
Nov. 7, 2012  (JP) ................. 2012-245785

(51) Int. Cl.
G06F 3/044 (2006.01)
G09G 3/36 (2006.01)
G06F 3/041 (2006.01)

(52) U.S. Cl.
CPC ......... G09G 3/3611 (2013.01); G06F 3/044 (2013.01); G06F 3/0412 (2013.01);
(Continued)

(58) Field of Classification Search
CPC . G06F 2203/04103; G06F 2203/04106; G06F 3/0412; G06F 3/0418; G06F 3/044
See application file for complete search history.

(56) References Cited

U.S. PATENT DOCUMENTS

2009/0183931 A1* 7/2009 Okano .................. G06F 3/0416
178/18.03
2010/0289759 A1* 11/2010 Fisher .................... G06F 3/044
345/173
(Continued)

FOREIGN PATENT DOCUMENTS

| JP | 2010-176571 A | 8/2010 |
|---|---|---|
| JP | 2010-191574 A | 9/2010 |
| JP | 2011-138278 A | 7/2011 |

OTHER PUBLICATIONS

Written Opinion of the International Searching Authority for PCT/JP2013/080067 mailed May 21, 2015 with an English Translation.

Primary Examiner — Hong Zhou
(74) Attorney, Agent, or Firm — Birch, Stewart, Kolasch & Birch, LLP

(57) ABSTRACT

Provided are a touch panel system with improved indicator detection accuracy and an electronic information device provided with the touch panel system. A touch panel system 1 includes: a touch panel 3 provided with a plurality of electrodes SL, DL; and an indicator position detection unit 5 for detecting a position of the indicator that is in contact with or close to the detection surface P, based on an output signal that is outputted by at least part of the electrodes SL, DL and shows a capacitance formed by the electrode SL. The touch panel system is characterized in that the indicator position detection unit 5 corrects detection sensitivity for each predetermined position within the detection surface P
(Continued)

so as to correspond to a pattern of the electrodes SL, DL, and detects the position of the indicator within the detection surface P.

9 Claims, 14 Drawing Sheets

(52) U.S. Cl.
CPC .. *G06F 3/0418* (2013.01); *G06F 2203/04103* (2013.01); *G06F 2203/04106* (2013.01); *G09G 2310/0202* (2013.01); *G09G 2310/027* (2013.01); *G09G 2354/00* (2013.01)

(56) References Cited

U.S. PATENT DOCUMENTS

| | | | | |
|---|---|---|---|---|
| 2012/0105368 A1* | 5/2012 | Kobayashi | ............ | G06F 3/0416 345/174 |
| 2012/0293453 A1* | 11/2012 | Yamada | ................ | G06F 3/0416 345/174 |
| 2013/0147752 A1* | 6/2013 | Simmons | ................ | G06F 3/044 345/174 |

\* cited by examiner

TOUCH PANEL SYSTEM

CROSS-REFERENCE TO RELATED APPLICATIONS

This application is a National Phase entry under 35 U.S.C. §371 of International Application No. PCT/JP2013/080067 filed on Nov. 7, 2013, which claims priority to Japanese Patent Application No. 2012-245785 filed on Nov. 7, 2012, all of which are hereby expressly incorporated by reference into the present application.

TECHNICAL FIELD

The present invention relates to a touch panel system and an electronic information device provided with the touch panel system.

BACKGROUND ART

In recent years, a touch panel system, which accepts a user's instruction by detecting a position of an indicator (e.g., a user's finger or a stylus, hereinafter) that is in contact with or close to a detection surface of a touch panel, has been increasingly installed in a cell phone, a personal computer, a vending machine, and the like. Further, recently, a projection type capacitive touch panel system in which a multi-touch operation (simultaneously detecting a plurality of indicators in contact with or close to the detection surface of the touch panel) has come to be broadly used in place of a resistive film touch panel system.

In the projection type capacitive touch panel system, there is used a touch panel including a plurality of upper electrodes that are provided so as to be parallel to each other along the detection surface, and lower electrodes that are provided so as to intersect with the upper electrodes and to be parallel to each other along the detection surface. In this touch panel, the upper electrode is provided between the lower electrode and the detection surface, and the upper electrode and the lower electrode form a two-layer structure.

The projection type capacitive touch panel system has a self-capacitive system and a mutual capacitive system. The self-capacitive system acquires a signal from each of the upper electrode and the lower electrode to detect a change (increase) in capacitance of each of the upper electrode and the lower electrode, to separately detect a position of the indicator in an array direction of the upper electrodes and a position of the indicator in an array direction of the lower electrodes. On the other hand, the mutual capacitive system drives one electrode (hereinafter, the case of the lower electrode will be illustrated) and acquires a signal from the other electrode (hereinafter, the case of the upper electrode will be illustrated), to detect a change (decrease) in capacitance between the upper electrode and the lower electrode, thereby detecting a position of the indicator within the detection surface.

In the projection type capacitive touch panel system, a distance between the detection surface and the lower electrode is longer than a distance between the detection surface and the upper electrode. For this reason, in the self-capacitive touch panel system, at a time when the indicator comes into contact with or close to the detection surface, an amount of change (amount of increase) in capacitance of the lower electrode becomes smaller than an amount of change (amount of increase) in capacitance of the upper electrode. Therefore, the detection accuracy of the position of the indicator based on the output signal of the lower electrode becomes lower than the detection accuracy of the position of the indicator based on the output signal of the upper electrode.

Therefore, Patent Document 1 proposes a self-capacitive touch panel system in which an area of the lower electrode is made larger than an area of the upper electrode, to make larger the amount of change (amount of increase) in capacitance of the lower electrode at a time when the indicator comes into contact with or close to the detection surface.

PRIOR ART DOCUMENT

Patent Document

Patent Document 1: Japanese Patent Application Publication NO. 2010-176571

SUMMARY OF THE INVENTION

Problems to be Solved by the Invention

Incidentally, the projection type capacitive touch panel system is formed by arraying a plurality of upper electrodes and lower electrodes. For this reason, a parasitic capacitance is formed between the indicator and each of a plurality of detecting electrodes (upper electrodes and lower electrodes in the self-capacitive system, and upper electrodes in the mutual capacitive system), and hence a change in capacitance is detected from an output signal of each of these plurality of detecting electrodes.

With regard to this, a method is considered to be adopted in which, for example, a centroidal position of distribution of the amount of change in capacitance is focused and when a change in capacitance at the centroidal position becomes larger than the detection reference, the centroidal position is detected as the position of the indicator within the detection surface. However, the magnitude of amount of change in capacitance at the centroidal position greatly varies in accordance with an actual position of the indicator (whether or not the indicator is present on a center line of the detecting electrode).

Specifically, when the indicator is present on a center line of a certain detecting electrode, a parasitic capacitance is formed mainly between the indicator and the certain detecting electrode. For this reason, the amount of change in capacitance at the foregoing centroidal position becomes large as compared to the following case. In this case, therefore, the indicator is easy to be detected.

On the other hand, when the indicator is present at a position apart from the center line of the certain detecting electrode, the parasitic capacitance is formed not only between the indicator and the certain detecting electrode, but also between the indicator and a detecting electrode around the certain detecting electrode. For this reason, the amount of change in capacitance at the foregoing centroidal position becomes small as compared to the above case. In this case, therefore, the indicator is difficult to be detected.

Even when the detection reference is set based on either of the above two cases, one or both of a position where the indicator is excessively difficult to be detected and a position where the indicator is excessively easy to be detected are generated within the detection surface, thus causing deterioration in indicator detection accuracy.

It is to be noted that in the touch panel system proposed in Patent Document 1, the upper electrode is formed in such a shape as to be sufficiently separated to reduce an influence by the parasitic capacitance formed between the adjacent detecting electrodes. However, the more the upper electrode is separated, the smaller the amount of change in capacitance becomes in the case of the indicator being present between the upper electrodes, thus causing deterioration in indicator detection accuracy. As thus described, there are limits on improvement in indicator detection accuracy only by changing the shape of the electrode.

Therefore, an object of the present invention is to provide a touch panel system with improved indicator detection accuracy, and an electronic information device provided with the touch panel system.

Means for Solving the Problem

In order to achieve the above object, the present invention provides a touch panel system comprising: a touch panel provided with a plurality of electrodes; and an indicator position detection unit for detecting a position of the indicator that is in contact with or close to the detection surface based on an output signal that is outputted by at least part of the electrodes and shows a capacitance formed by the electrode, wherein the indicator position detection unit corrects detection sensitivity for each predetermined position within the detection surface so as to correspond to a pattern of the electrodes, and detects the position of the indicator within the detection surface.

It is to be noted that correcting the detection sensitivity means varying a relative relation between a detection reference and a signal value as an object to which the detection reference is applied (e.g., an amount of change in capacitance or a capacitance value, described later). Specifically, for example, one or both of varying the detection reference and varying the signal value are included in the correction of the detection sensitivity.

Further, in the touch panel system with the above characteristic, the position of the indicator within the detection surface may be detected by use of a detection reference that is set for each predetermined position within the detection surface so as to correspond to the pattern of the electrodes.

Further, in the touch panel system with the above characteristics, the indicator position detection unit detects the position of the indicator within the detection surface based on a capacitance value that is obtained by processing the output signal and corresponds to the capacitance at each predetermined position within the detection surface, and the indicator position detection unit may correct the capacitance value by a correction method set for each predetermined position within the detection surface so as to correspond to the pattern of the electrodes, and may detect the position of the indicator within the detection surface based on the capacitance value obtained after the correction.

Further, in the touch panel system with the above characteristics, the indicator position detection unit may correct the capacitance value corresponding to a certain position within the detection surface based on the capacitance value corresponding to the certain position and the capacitance value corresponding to at least one position around the certain position.

Further, in the touch panel system with the above characteristics, the indicator position detection unit may correct the detection reference by a correction method set for each predetermined position within the detection surface so as to correspond to the pattern of the electrodes, and may detect the position of the indicator within the detection surface by use of the detection reference after the correction.

Further, in the touch panel system with the above characteristics, the touch panel preferably includes, as the electrodes, a plurality of lower electrodes that are provided so as to be parallel to each other along the detection surface, and a plurality of upper electrodes that intersect with the lower electrodes between the detection surface and the lower electrodes and are provided so as to be parallel to each other along the detection surface. It is preferable that within the detection surface, the detection sensitivity is corrected such that the indicator is easier to be detected at a position more apart from a center line of the upper electrode.

Further, in the touch panel system with the above characteristics, it is preferable that the indicator position detection unit compares the capacitance found from the output signal obtained in a state where the indicator that is in contact with or close to the detection surface is not present and the capacitance found from the output signal that is obtained at the time of detecting the position of the indicator within the detection surface, to find distribution of an amount of change in the capacitance, and detects the centroidal position of the distribution of the amount of change in the capacitance as the position of the indicator within the detection surface when the amount of change in the capacitance at the centroidal position is larger than the detection reference, and within the detection surface, the smaller detection reference is set at a position more apart from the center line of the upper electrode.

Further, in the touch panel system with the above characteristics, the correction method for the detection sensitivity may be set based on a result of processing on the output signal obtained at the time of the indicator actually coming into contact with the detection surface.

Further, the touch panel system with the above characteristics may further comprise: a display device for displaying an image; and a host terminal for controlling an image displayed by the display device, the touch panel may be provided on a display surface of the display device where the image is displayed, the host terminal may control the image displayed on the display device, to guide the indicator to come into contact with a predetermined position within the detection surface, and based on the obtained output signal, a correction method for the detection sensitivity may be found.

Further, in the touch panel system with the above characteristics, the correction method for the detection sensitivity may be set based on a characteristic of the pattern of the electrodes.

Further, the touch panel system with the above characteristics may further comprise a detection sensitivity correction method setting unit for setting or updating the correction method for the detection sensitivity based on a result of processing on the output signal by the indicator position detection unit.

Further, in the touch panel system with the above characteristics, the electrode may be made of a pattern formed by linearly connecting a plurality of polygonal or circular pad units.

Further, the touch panel system with the above characteristics may further comprise a display device for displaying an image, and the touch panel may be provided on the display surface of the display device where the image is displayed.

Further, in the touch panel system with the above characteristics, the display device may be a liquid crystal display, a plasma display, an organic EL display or a field emission display.

Further, the present invention provides an electronic information device comprising the touch panel system with the above characteristics.

Effects of the Invention

According to the touch panel system and the electronic information device with the above characteristics, it is possible to detect an indicator that is in contact with or close to the detection surface at any position within the detection surface with appropriate detection sensitivity corresponding to that position. This allows improvement in indicator detection accuracy.

DESCRIPTION OF EMBODIMENTS

Hereinafter, as each of first to third embodiments of the present invention, a description will be given by illustrating a mutual capacitive touch panel system where a drive line and a sense line are provided along a detection surface of a touch panel.

First Embodiment

<Example of Overall Configuration of Touch Panel System>

Figure 1:
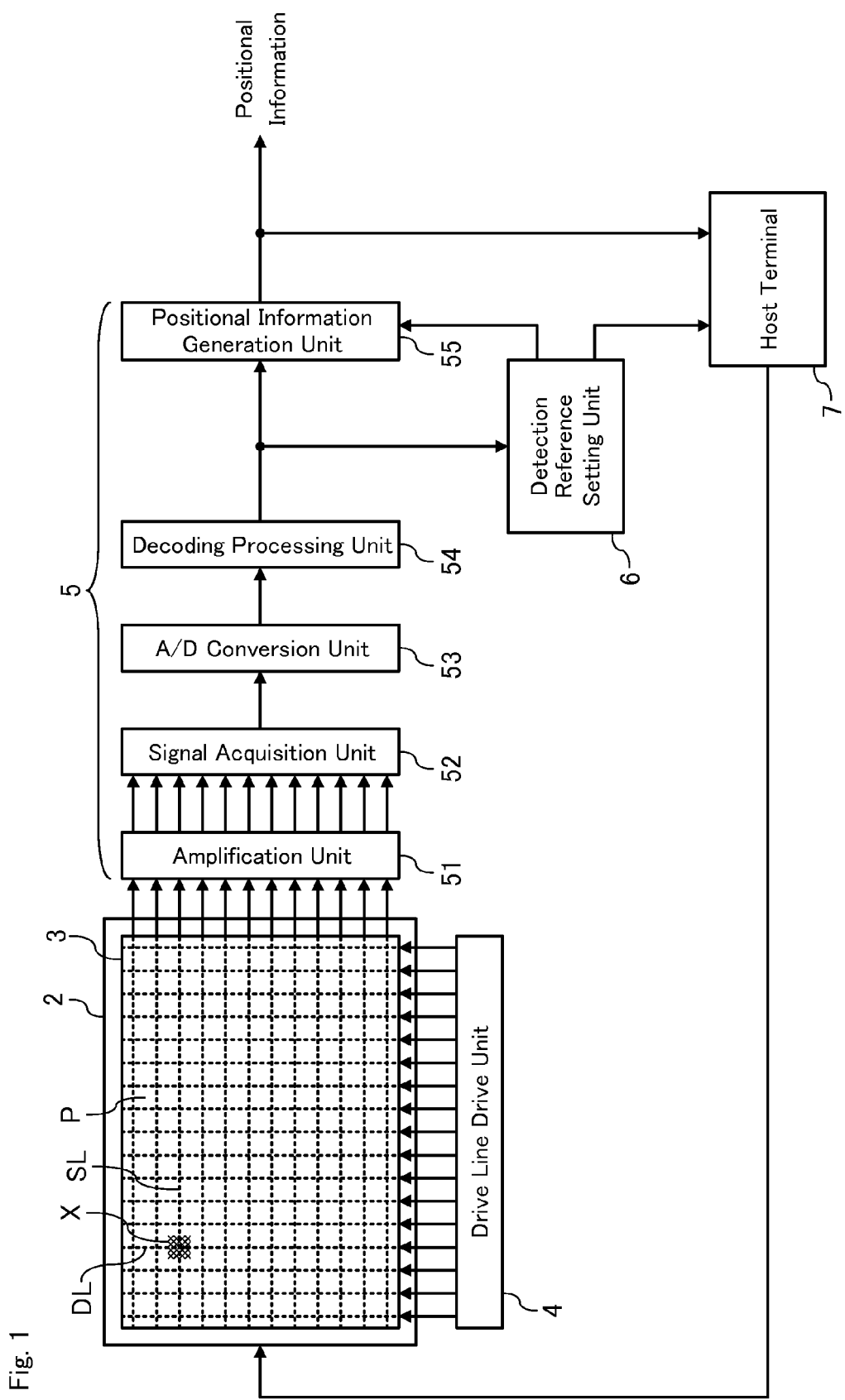
FIG. 1 is a block diagram showing an example of an overall configuration of a touch panel system according to a first embodiment of the present invention.

First, an example of an overall configuration of the touch panel system according to the first embodiment of the present invention will be described with reference to the drawings. FIG. 1 is a block diagram showing the example of the overall configuration of the touch panel system according to the first embodiment of the present invention.

As shown in FIG. 1, a touch panel system 1 is provided with: a display device 2 for displaying an image on a display surface; a touch panel 3 which is provided on the display surface of the display device 2 and outputs an output signal in accordance with the presence or absence of an indicator that is in contact with or close to a detection surface P from a sense line SL by driving of a drive line DL; a drive line drive unit 4 for driving the drive line DL; an indicator position detection unit 5 for processing the output signal outputted by the sense line SL to detect a position of the indicator within the detection surface P; a detection reference setting unit 6 (detection sensitivity correction method setting unit) for setting a detection reference that is used at the time of the indicator position detection unit 5 detecting the position of the indicator within the detection surface P; and a host terminal 7 for controlling the image displayed by the display device 2.

The display device 2 is composed of a liquid crystal display, a plasma display, an organic EL display, a field emission display, or the like, for example. It is to be noted that the display device 2 is not restricted to these, but may be any kind.

The touch panel 3 is provided with: a plurality of drive lines DL (lower electrodes) which are provided in parallel to each other along the detection surface P, and are each driven by being given a predetermined drive signal; and a plurality of sense lines SL (upper electrodes) which are provided in parallel to each other along the detection surface P so as to intersect (three-dimensionally intersect) with the drive line DL, and outputs the output signal in accordance with a capacitance that is formed between the sense line SL and the drive line DL by driving of the drive line DL. It is to be noted that the sense line SL is provided between the drive line DL and the detection surface P.

The output signal serves as a signal showing whether the indicator is in contact with or close to a detection region X (an intersecting portion between the drive line DL and the sense line SL or a portion in the vicinity thereof, hereinafter) within the detection surface P (whether or not the indicator is in contact with or close to the detection region X, a clearance between the detection region X and the indicator, and the like), and the smaller the clearance between the detection region X and the indicator becomes, the smaller the capacitance becomes. It should be noted that, although FIG. 1 illustrates the case where the drive line DL and the sense line SL vertically intersect, they may intersect at an angle other than a vertical angle.

The drive line drive unit 4 drives the drive line DL by application of a predetermined signal thereto. When the drive line DL is driven, the sense line SL intersecting with the driven drive line DL outputs an output signal in accordance with a capacitance that is formed between the sense line SL and the driven drive line DL. At this time, when the drive line drive unit 4 simultaneously drives a plurality of drive lines DL, one sense line SL outputs an output signal corresponding to a plurality of capacitances formed between the sense line SL and the plurality of drive lines DL, but the indicator position detection unit 5 can find each of the capacitances from such an output signal corresponding to the superposition of the capacitances by decoding processing of a decoding processing unit 54 described later.

The indicator position detection unit 5 is provided with: an amplification unit 51 for amplifying an output signal outputted by the sense line SL; a signal acquisition unit 52 for acquiring the output signal amplified by the amplification unit 51 to output the acquired signal in a time division manner; an A/D conversion unit 53 for converting an analog signal outputted by the signal acquisition unit 52 to a digital signal; the decoding processing unit 54 for finding distribution of an amount of change in capacitance within the detection surface P based on the digital signal converted by the A/D conversion unit 53; and a positional information generation unit 55 for detecting a position of the indicator within the detection surface P based on the distribution of the amount of change in capacitance acquired by the decoding processing unit 54 to generate positional information showing that position.

The decoding processing unit 54 performs decoding processing on the digital signal obtained from the A/D conversion unit 53 based on a signal pattern of the drive signal given to the drive line DL by the drive line drive unit 4, thereby finding distribution (two-dimensional distribution) of the capacitances within the detection surface P. Further, before the detection of the indicator (e.g., at the time of calibration that is performed immediately after start-up of the touch panel system), the decoding processing unit 54 acquires a digital signal found from an output signal obtained in a state where the indicator that is in contact with or close to the detection surface P is not present, thereby previously finding distribution (two-dimensional distribution) of the capacitances within the detection surface P in the state where the indicator that is in contact with or close to the detection surface P is not present.

The decoding processing unit 54 then compares the distribution of the capacitances within the detection surface P in the state where the indicator that is in contact with or close to the detection surface P is not present and the distribution of the capacitances within the detection surface P found at the time of detecting the position of the indicator, to find distribution of an amount of change in capacitance within the detection surface P (namely, two-dimensional distribution of components of capacitances having changed due to the indicator coming into contact with or close to the detection surface P). It should be noted that in the second and third embodiments described later, this amount of change in capacitance at each predetermined position within the detection surface P will be expressed as a "capacitance value" for convenience of description.

Specifically, for example, the decoding processing unit 54 subtracts the distribution of the capacitances within the detection surface P found at the time of detecting the position of the indicator from the distribution of the capacitances within the detection surface P in the state where the indicator that is in contact with or close to the detection surface P is not present, thereby finding distribution of the amount of change in capacitance within the detection surface P. It is to be noted that the amount of change in capacitance may be one made to be an absolute value.

The positional information generation unit 55 uses the distribution of the amount of change in capacitance within the detection surface P obtained by the decoding processing unit 54 and a detection reference having been set for each predetermined position within the detection surface P (e.g., having been two-dimensionally set at a shorter interval than an interval of each intersection between the sense line SL and the drive line DL), to find the position of the indicator within the detection surface P and generate positional information.

Specifically, for example, the positional information generation unit 55 finds a centroidal position of the distribution of the amount of change in capacitance within the detection surface P, and when the amount of change in capacitance at the centroidal position is larger than the detection reference, the positional information generation unit 55 takes the centroidal position as the position of the indicator in contact with or close to the detection surface P. It is to be noted that the positional information generation unit 55 may use all the amounts of change in capacitance within the detection surface P to find the centroidal position, or may use part thereof (e.g. portion at each of which the amount of change in capacitance becomes larger than a predetermined threshold) to find the centroidal position. Further, the positional information generation unit 55 may perform interpolation processing or the like on the amount of change in capacitance in the detection region X in the vicinity of the centroidal position (or over the detection surface P) to find the amount of change in capacitance at the centroidal position.

The positional information generation unit 55 then generates and outputs positional information showing the position of the indicator within the detection surface P. It is to be noted that in a case where the positional information generation unit 55 is unable to find the position of the indicator in contact with or close to the detection surface P, such as a case where the indicator that is in contact with or close to the detection surface P is not present, the positional information generation unit 55 may generate and output positional information showing that fact. Further, a detail of the detection reference will be described later.

The detection reference setting unit 6 sets the detection reference for use in the positional information generation unit 55 based on the distribution of the amount of change in capacitance obtained from the decoding processing unit 54. For example, the positional information generation unit 55 stores the detection reference found by the detection reference setting unit 6. It should be noted that a detail of an operation of the detection reference setting unit 6 will be described later by giving an example of a specific operation.

The host terminal 7 controls the whole of the touch panel system 1, and especially controls an image displayed on the display device 2. It is to be noted that, although not particularly shown in FIG. 1, the host terminal 7 can control each unit such as the drive line drive unit 4 and the indicator position detection unit 5. Further, a detail of an operation of the host terminal 7 will be described later by giving an example of a specific operation.

<Setting Method for Detection Reference>

Figure 2A:
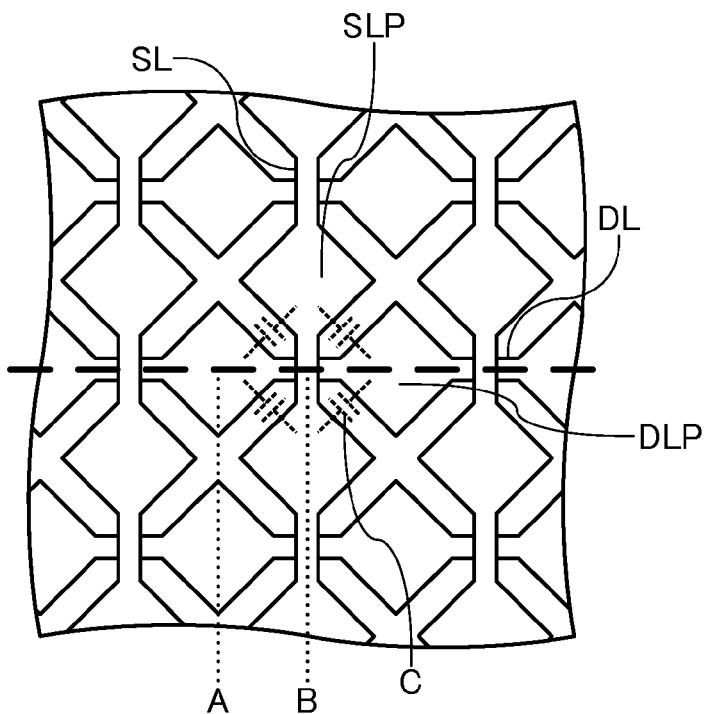
FIG. 2A is a view showing a specific example of a pattern of electrodes and FIGS. 2B and 2C are diagrams each showing a specific example of a setting method for a detection reference.
Figure 2B:
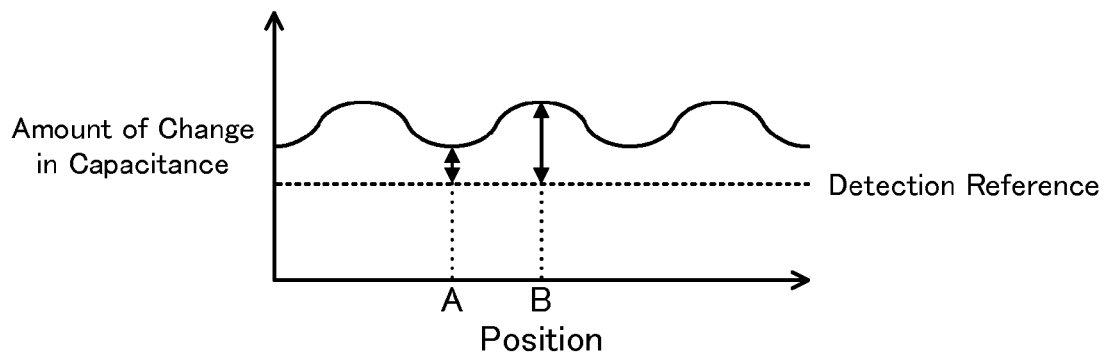
Figure 2C:
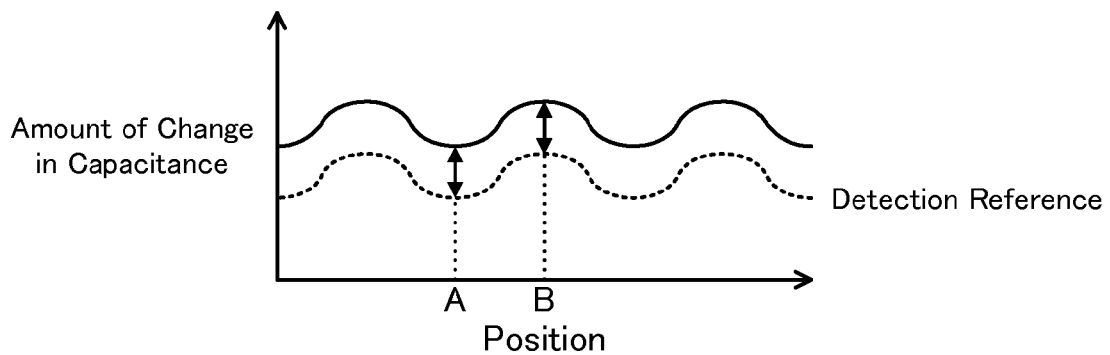

Next, a setting method for the detection reference will be described with reference to the drawings. FIG. 2A is a view showing a specific example of a pattern of electrodes and FIGS. 2B and 2C are diagrams each showing a specific example of a setting method for a detection reference. FIG. 2A is a plan view showing the specific example of the pattern of the electrodes. FIG. 2B is a graph displaying an amount of change in capacitance and a detection reference together in the case of setting the detection reference that is a fixed value. Further, FIG. 2C is a graph displaying an amount of change in capacitance and a detection reference together in the case of setting the detection reference that corresponds to a pattern of the sense lines. It should be noted that a position on a horizontal axis of each of the graphs shown in FIGS. 2B and 2C corresponds to a position of a thick broken line shown in FIG. 2A. Further, the amount of change in capacitance shown in each of FIGS. 2B and 2C shows an amount of change in capacitance at each position on the thick broken line of FIG. 2A in the case of bringing the indicator into contact with each position.

As shown in FIG. 2A, the drive line DL is provided with a drive line pad unit DLP where an area locally increases, except for a portion intersecting with the sense line SL. Similarly, the sense line SL is provided with a sense line pad unit SLP where an area locally increases, except for a portion intersecting with the drive line DL. Then, as shown in FIG. 2A, at the portion where the drive line DL and the sense line SL intersect, a capacitance C is formed between the drive line DL and the sense line SL (especially between the adjacent drive line pad unit DLP and sense line pad unit SLP). It should be noted that the drive line DL may not be provided with the drive line pad unit DLP, and the sense line SL may not be provided with the sense line pad unit SLP. Even in this case, the capacitance C is formed at the portion where the drive line DL and the sense line SL intersect.

As described above, or as shown in FIGS. 2B and 2C, the amount of change in capacitance greatly varies in accordance with the position of the indicator within the detection surface P. Specifically, when the indicator is present at a position B on the center line of the sense line SL, the amount of change in capacitance becomes large. On the other hand, when the indicator is present at a position A apart from the center line of the sense line SL, the amount of change in capacitance becomes small.

In this case, as shown in FIG. 2B, when the detection reference that is a fixed value is set by taking the position B where the amount of change in capacitance is large as a reference, the indicator becomes excessively difficult to be detected (i.e., detection sensitivity becomes excessively small) at the position A where the amount of change in capacitance is small. As opposed to this, when the detection reference that is a fixed value is set by taking the position A where the amount of change in capacitance is small as a reference (when a detection reference sufficiently smaller than the detection reference shown in FIG. 2B is set), the indicator becomes excessively easy to be detected (i.e., detection sensitivity becomes excessively large) at the position B where the amount of change in capacitance is large. Accordingly, even when the detection reference is set by taking the amount of change in capacitance at either the position A or the position B, it is difficult to improve the indicator detection accuracy.

Therefore, in the touch panel system 1 according to the first embodiment of the present invention, a detection reference corresponding to the pattern (e.g., size, shape, arrangement interval, arrangement position, and the like) of the sense line SL is set. Specifically, there is set a detection reference that becomes larger at a position nearer the center line of the sense line SL and becomes smaller at a position more apart from the center line of the sense line SL. Specifically, for example, there is set a detection reference reduced just by a predetermined amount (e.g., 15%) with respect to the amount of change in capacitance at each position within the detection surface P in the case of the indicator being in contact with each position.

Thereby, the detection sensitivity is corrected so as to correspond to the pattern of the sense lines SL for each predetermined position within the detection surface P. As described above, the detection sensitivity is the relative relation between the amount of change in capacitance and the detection reference, and hence varying either (or both) of them enables correction of the detection sensitivity. It is to be noted that in the touch panel system 1 of the first embodiment, the detection sensitivity is corrected by setting the varied detection reference.

As described above, in the touch panel system 1 according to the first embodiment of the present invention, it is possible to detect the indicator that is in contact with or close to the detection surface P at any position within the detection surface P by means of appropriate detection reference (i.e., appropriate detection sensitivity) corresponding to that position. This allows improvement in indicator detection accuracy.

<Specific Operation for Setting Detection Reference>

Figure 3:
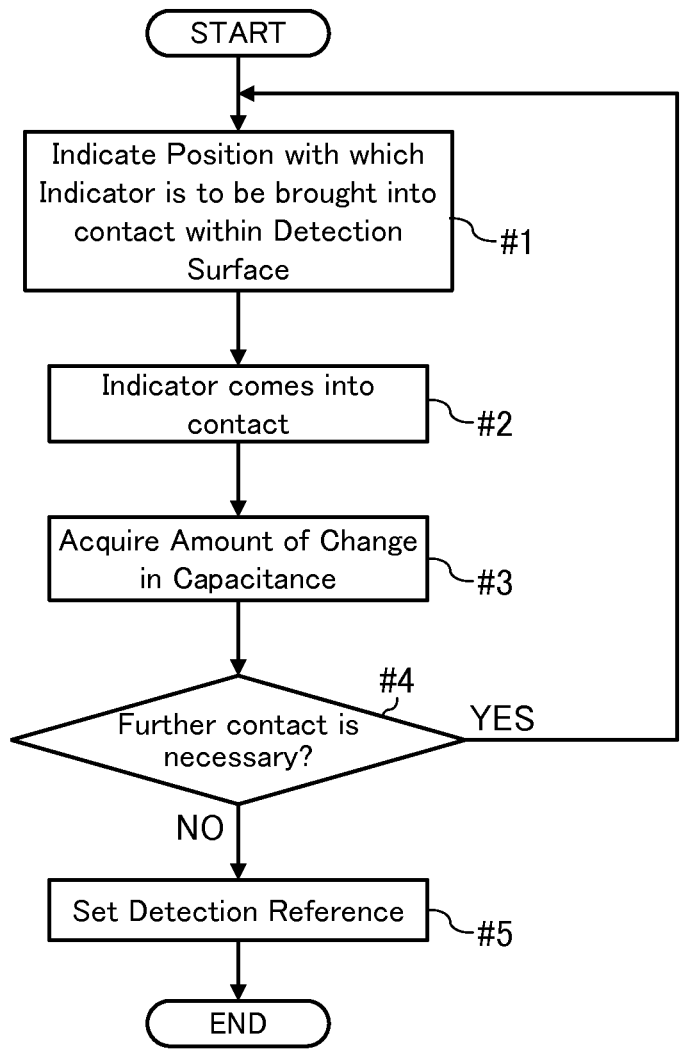
FIG. 3 is a flowchart showing an example of a specific operation of the touch panel system for setting the detection reference.

An example of a specific operation of the touch panel system 1 that realizes the foregoing setting method for the detection reference will be described with reference to the drawings. FIG. 3 is a flowchart showing the example of the specific operation of the touch panel system for setting the detection reference. It is to be noted that the operation in the flowchart shown in FIG. 3 is performed mainly at the time of start-up of the touch panel system 1, at the time when re-setting of the detection reference is instructed by the user, or at some other time.

As shown in FIG. 3, when the setting of the detection reference is started, first, the detection reference setting unit 6 indicates the host terminal 7 a position with which the indicator is to be brought into contact within the detection surface P. Accordingly, the host terminal 7 controls an image displayed on the display device 2, thereby indicating the user the position with which the indicator is to be brought into contact (Step #1).

Figure 4:
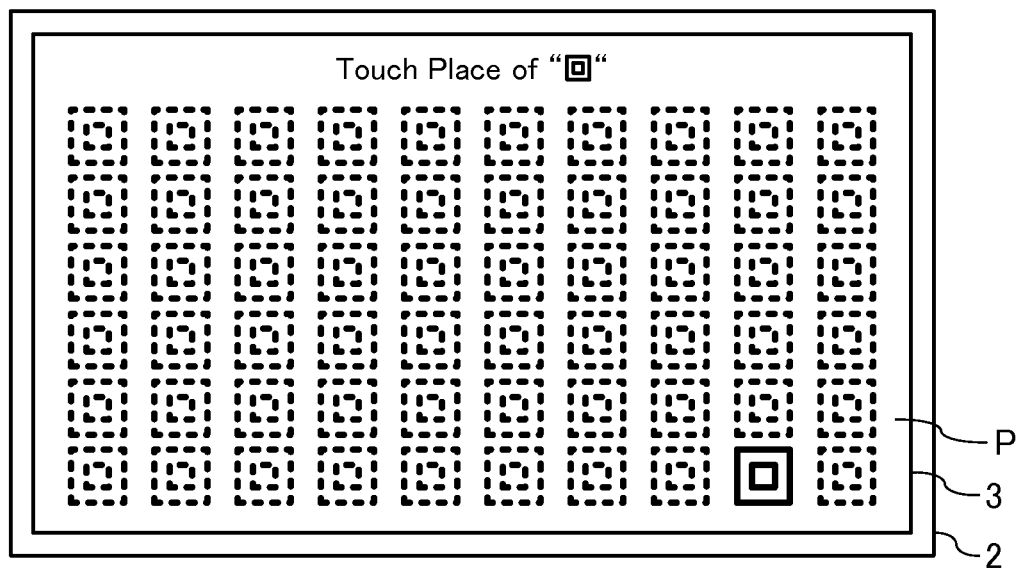
FIG. 4 is a view showing a specific example of an image that is displayed on a display surface of a display device at the time of setting the detection reference.

A specific examples of the image displayed on the display device 2 at this time will be described with reference to FIG. 4. FIG. 4 is a view showing a specific example of the image that is displayed on the display surface of the display device at the time of setting the detection reference.

FIG. 4 shows a case where an image arrayed with a plurality of double rings (figures similar to a Chinese character "KAI") is displayed on the display surface of the display device 2. The host terminal 7 displays only a double ring within the detection surface P, with which the indicator is to be brought into contact, with a solid line, and displays the others with broken lines, thereby explicitly indicating the user the position with which the indicator is to be brought into contact. The user having looked at this image is then guided so as to bring the indicator such as his or her finger into contact with a displayed position of the double ring displayed with the solid line.

When the user brings the indicator into contact with the displayed position of the double ring shown with the solid line (Step #2), the detection reference setting unit 6 acquires an amount of change in capacitance at that position from distribution of the amount of change in capacitance outputted by the decoding processing unit 54 (Step #3). The detection reference setting unit 6 then checks whether or not the contact of the indicator with the detection surface P is further necessary (e.g., whether or not planned contact of the indicator has all been completed) (Step #4).

When the contact of the indicator with the detection surface P is further necessary (Step #4, YES), the detection reference setting unit 6 again indicates the host terminal 7 a position with which the indicator is to be brought into contact within the detection surface P (especially a position different from the position indicated the last time) (Step #1). In contrast, when the contact of the indicator with the detection surface P is not necessary (Step #4, NO), the detection reference setting unit 6 sets the detection reference at each position within the detection surface P (Step #5) based on the amount of change in capacitance at each position acquired in Step #3, and the operation is completed.

It is to be noted that FIG. 4 illustrates the case of displaying the image arrayed with the figures on the display surface of the display device 2, but an image of other than figures may be displayed. For example, there may be displayed an image arrayed with a plurality of input buttons each showing different characters (including numbers, symbols, and the like). Further, in this case, the host terminal 7 may implicitly indicate the user the position with which the indicator is to be brought into contact within the detection surface P, regarding an input-button image of the position with which the indicator is to be brought into contact as one showing a predetermined character constituting a character string such as a password that the user has recognized, for example. As a result, the user having looked at this image is guided so as to bring the indicator such as his or her finger into contact with a displayed position of the input-button image showing the predetermined character.

Further, in the present example of the operation, from the viewpoint of avoiding an excessive load on the user, it is preferable not to set the number of times of contact of the indicator with the detection surface P (number of times of repeating Steps #1 and "2) to so large a number. However, when the number of times of contact of the indicator with the detection surface P is made small, the number of amounts of change in capacitance at a time when the indicator comes into contact with the detection surface P, which can be acquired by the detection reference setting unit 6, becomes small.

Therefore, the detection reference setting unit 6 may perform interpolation processing or the like as necessary, to generate data necessary for setting the detection reference. Specifically, for example, the detection reference setting unit 6 may add the detection references obtained with respect to a plurality of positions set by the foregoing operation (e.g., the position A and the position B of FIG. 2) and average the added detection references, thereby obtaining a detection reference at a position between those positions. Further, the detection reference setting unit 6 may average the detection references obtained with respect to positions having similar relative positional relations with the pattern of the sense lines SL (e.g., a plurality of positions on the center lines of the sense lines SL), to set a detection reference at other similar positions. Moreover, the detection reference setting unit 6 may perform these calculations for the amounts of change in capacitance obtained in Step #3.

<Electronic Information Device>

Figure 5:
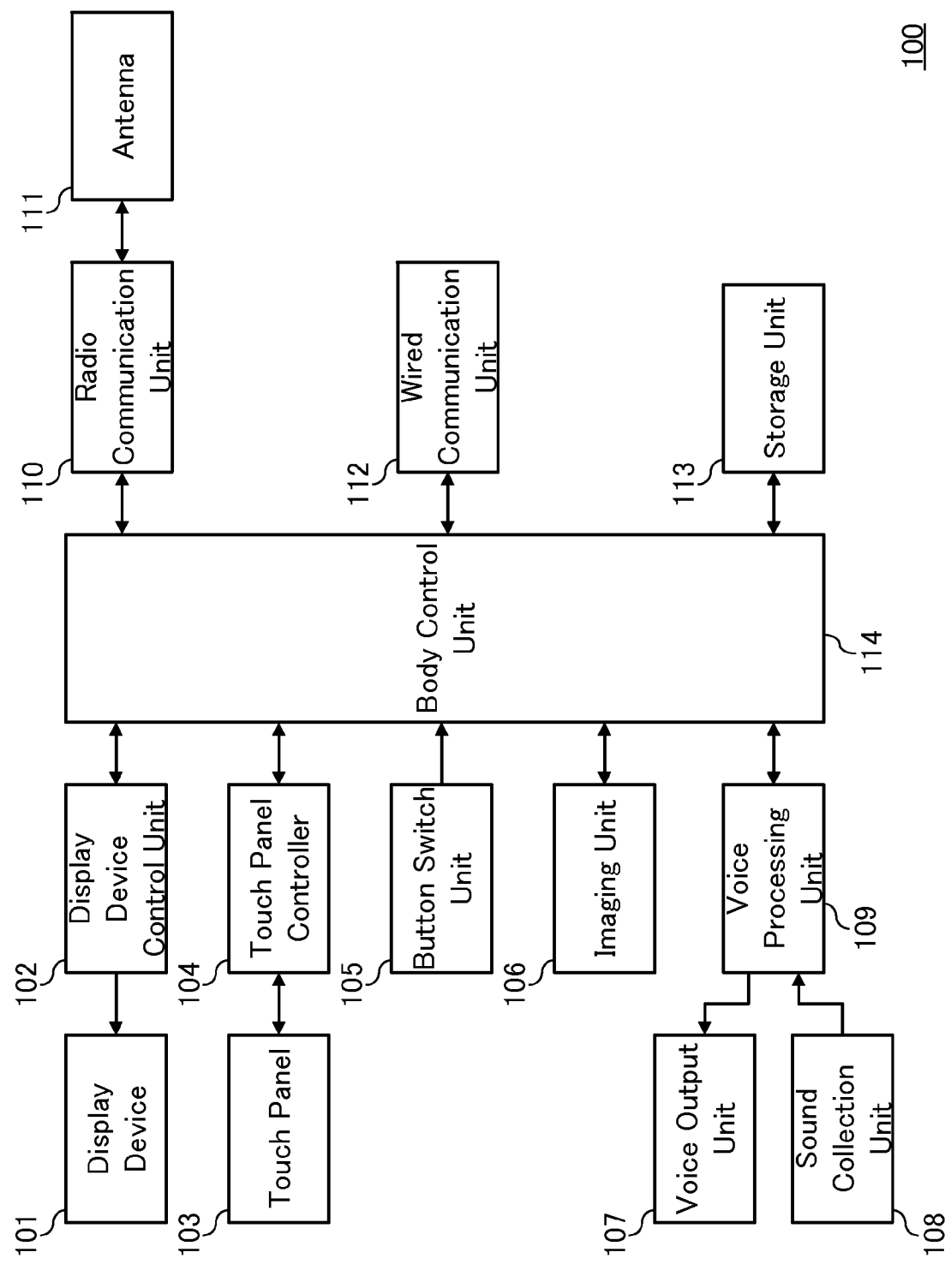
FIG. 5 is a block diagram showing a configuration example of an electronic information device according to the first embodiment of the present invention.

A configuration example of an electronic information device according to the first embodiment of the present invention provided with the foregoing touch panel system 1 will be described with reference to FIG. 5. FIG. 5 is a block diagram showing the configuration example of the electronic information device according to the first embodiment of the present invention.

As shown in FIG. 5, an electronic information device 100 according to the first embodiment of the present invention includes: a display device 101 (corresponding to the display device 2 of FIG. 1); a display device control unit 102 for controlling the display device 101; a touch panel 103 (corresponding to the touch panel 3 of FIG. 1); a touch panel controller 104 (corresponding to the drive line drive unit 4, the indicator position detection unit 5 and the detection reference setting unit 6 of FIG. 1); a button switch unit 105 for accepting the user's instruction by being pressed by the user; an imaging unit 106 for generating image data by imaging; a voice output unit 107 for outputting inputted voice data as a voice; a sound collection unit 108 for generating voice data by collecting sound; a voice processing unit 109 for performing processing on the voice data that is given to the voice output unit 107 or processing on the voice data that is given from the sound collection unit 108; a radio communication unit 110 for communicating communication data to and from an external device of the electronic information device 100 by radio; an antenna 111 for emitting communication data communicated by the radio communication unit 110 by radio and receiving an electromagnetic wave emitted from the external device of the electronic information device 100; a wired communication unit 112 for communicating communication data to and from the external device of the electronic information device 100 by wire; a storage unit 113 for storing a variety of data; and a body control unit 114 (corresponding to the host terminal 7) for controlling the whole operation of the electronic information device 100.

It is to be noted that part or all of the foregoing indicator position detection unit 5 and detection reference setting unit 6 may not be in the touch panel controller 104 but be part of the body control unit 114. Further, the electronic information device 100 shown in FIG. 5 is merely one example of application of the touch panel system 1. The foregoing touch panel system 1 is also applicable to an electronic information device having a different configuration from that of the electronic information device 100.

<Modification, Etc.>

[1] The mutual capacitive touch panel system 1 has been illustrated as the first embodiment of the present invention, but the present invention is also applicable to a touch panel system of another system. Specifically, for example, the present invention is also applicable to the self-capacitive touch panel system. It is to be noted that as described above, in the self-capacitive touch panel system, the position of the indicator in the array direction of the upper electrodes and the position of the indicator in the array direction of the lower electrodes are separately detected. For this reason, the present invention is applicable to one or both of detection at these two kinds of positions.

Figure 6:
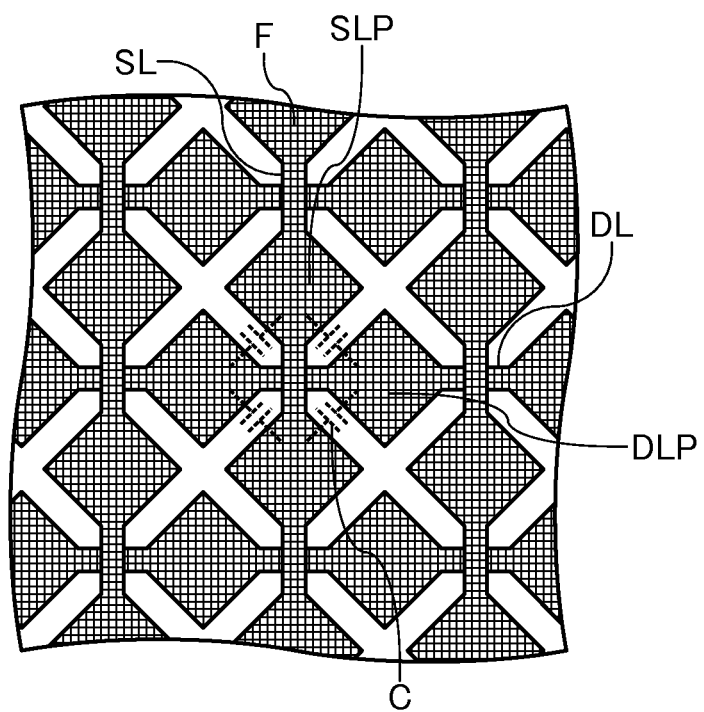
FIG. 6 is a plan view showing another example of the structure of the electrodes.

[2] As shown in FIG. 2A, the drive line DL and the sense line SL may be composed of a transparent material such as ITO (Indium Tin Oxide), or may be composed of a material other than this. For example, as shown in FIG. 6, the drive line DL and the sense line SL may be composed of meshes of thin metallic wire F. It should be noted that FIG. 6 is a plan view showing another example of the structure of the electrodes.

Further, FIG. 2A and FIG. 6 illustrate each the touch panel 3 provided with the drive line DL having a pattern formed by linearly connecting a plurality of rhombic drive line pad units DLP and the sense line SL having a pattern formed by linearly connecting a plurality of rhombic sense line pad units SLP, but the patterns of the drive line DL and the sense line SL are not restricted to these examples. For example, the drive line DL and the sense line SL may each have a pattern formed by linearly connecting a plurality of circular pad units, or may each have a pattern formed by linearly connecting a plurality of polygonal pad units, such as square or hexagonal ones. Moreover, the pattern of the sense lines SL does not necessarily have the same shape as that of the pattern of the drive lines DL, but may have a different shape from that of the pattern of the drive lines DL.

[3] Although FIG. 5 illustrates the operation in the case of setting the detection reference by use of the amount of change in capacitance that is obtained at the time of the indicator being brought into contact with the detection surface P by the user, the detection reference can also be set by an operation or a method other than this.

Figure 7:
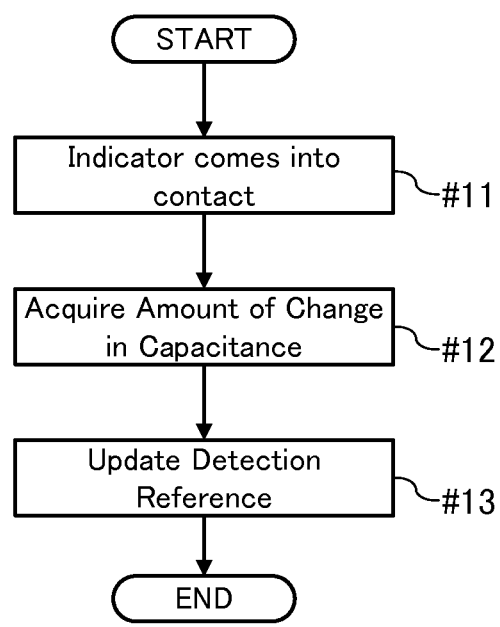
FIG. 7 is a flowchart showing an example of a specific operation of the touch panel system for updating the detection reference.

For example, at the time of normal operation of the touch panel system 1, the detection reference setting unit 6 may acquire, as necessary, the amount of change in capacitance at a time when the indicator comes into contact with the detection surface P, thereby dynamically setting (updating) the detection reference. An example of the operation of the touch panel system 1 in the case of updating the detection reference as above will be described with reference to the drawing. FIG. 7 is a flowchart showing an example of a specific operation of the touch panel system for updating the detection reference. It should be noted that the operation shown in FIG. 7 is performed in the case of making update once, but the operation can be repeatedly performed.

As shown in FIG. 7, at the time of normal operation of the touch panel system 1 (e.g., at the time when the user is executing an application or the like by use of the electronic information device 100), when the indicator comes into contact with the detection surface P (Step #11), the detection reference setting unit 6 detects a position where the indicator has come into contact within the detection surface P from the distribution of the amount of change in capacitance outputted by the decoding processing unit 54, and acquires the amount of change in capacitance at that position (Step #12). The detection reference setting unit 6 then updates the detection reference based on the amount of change in capacitance acquired in Step #12 (Step #13). At this time, the detection reference setting unit 6 may update the detection reference only at the position where the indicator has come into contact within the detection surface P by use of the amount of change in capacitance obtained in Step #12, or may perform the interpolation processing or the like and update the detection reference along with a detection reference at another position.

It should be noted that in the case of carrying out the detection reference updating method of the present example, an initial state of the detection reference may be a fixed value as shown in FIG. 2B or may be one that is set corresponding to the pattern of the sense lines SL as shown in FIG. 2C.

Further, the update of the detection reference by the method of the present example may be constantly made, but it may also be made in the case of there being the user's instruction, or may also be automatically performed every predetermined period.

Figure 8:
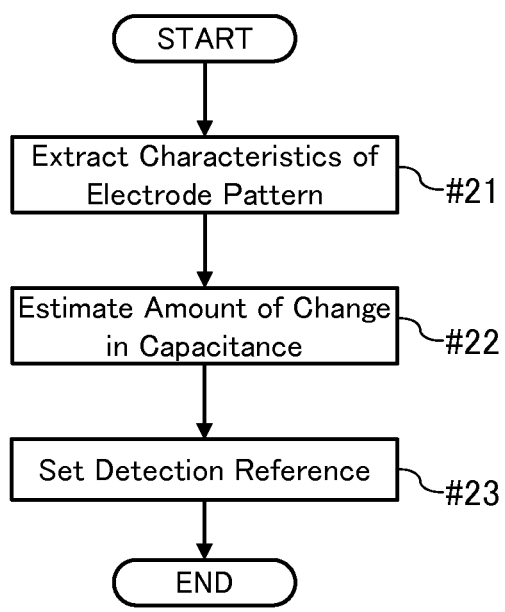
FIG. 8 is a flowchart showing one example of the setting method for the detection reference.

[4] As described above, the detection reference corresponds to the pattern of the sense lines SL. Therefore, for example, before shipment of the touch panel system 1 (or the electronic information device 100), the detection reference can also be found and set from characteristics of the pattern of the sense lines SL, without actually bringing the indicator into contact with or close to the detection surface P. One example of the method for setting the detection reference in this manner will be described with reference to the drawing. FIG. 8 is a flowchart showing one example of the setting method for the detection reference.

As shown in FIG. 8, first, characteristics of the pattern of the sense lines SL are extracted (Step #21). Specifically, for example, a size, a shape, an arrangement interval, an installation position and the like of the sense lines SL are extracted as characteristics. Next, based on the characteristics of the pattern of the sense lines SL obtained in Step #21, an amount of change in capacitance at each position on the detection surface P in the case of the indicator coming into contact with each position, as shown in FIGS. 2B and 2C, is estimated by simulation or the like (Step #22). Then, based on the amount of change in capacitance at each position within the detection surface P estimated in Step #22, a detection reference at each position is set by a similar method to that of Step #5 of FIG. 3 (Step #23).

It is to be noted that in the case of executing the method of the present example, for example, a detection reference may be found by use of an external computing device of the touch panel system 1, and the detection reference may be stored into the positional information generation unit 55. In this case, the detection reference setting unit 6 may not be provided in the touch panel system 1. But, for example, in the case of combining the setting method for the detection reference in the present example with another setting method for the detection reference (specifically, for example in the case of finding the detection reference in the initial state in the setting method in [3] by the method of the present example), it can be necessary to provide the detection reference setting unit 6 in the touch panel system 1.

[5] Although the case of setting the detection reference in accordance with the pattern of the sense lines SL as the upper electrode has been mainly illustrated in FIGS. 2A to 2C, when there is a relation between the amount of change in capacitance and the relative positional relation between the position of contact of the indicator and the pattern of the drive lines DL as the driving electrode, a detection reference corresponding not only to the pattern of the sense lines SL but also to the pattern of the drive lines DL may be set.

[6] For example, before shipment of the touch panel system 1 (or the electronic information device 100), the detection reference corresponding to the pattern of the sense lines SL may be set by use of a test device for processing output signals obtained by bringing the indicator into contact with a variety of positions within the detection surface P, to find the amount of change in capacitance at a time when the indicator comes into contact with the detection surface P. In this case, the detection reference setting unit 6 may not be provided in the touch panel system 1.

Second and Third Embodiments

Next, the touch panel system according to each of second and third embodiments of the present invention will be described with reference to the drawings. It is to be noted that hereinafter, in describing the touch panel system according to each of the second and third embodiments of the present invention, a difference from the foregoing touch panel system 1 according to the first embodiment (cf. FIGS. 1 to 8) will be chiefly described and descriptions of similarities thereto will be appropriately omitted. It is then assumed that the description of the foregoing touch panel system 1 according to the first embodiment is naturally applicable to the touch panel system 1 according to each of the second and third embodiments of the present invention so long as it is not particularly contradictory. For example, as is the foregoing touch panel system 1 according to the first embodiment, the touch panel system according to each of the second and third embodiments that will be described below is applicable to the electronic information device 100 (cf. FIG. 5) according to the first embodiment.

Second Embodiment

Figure 9:
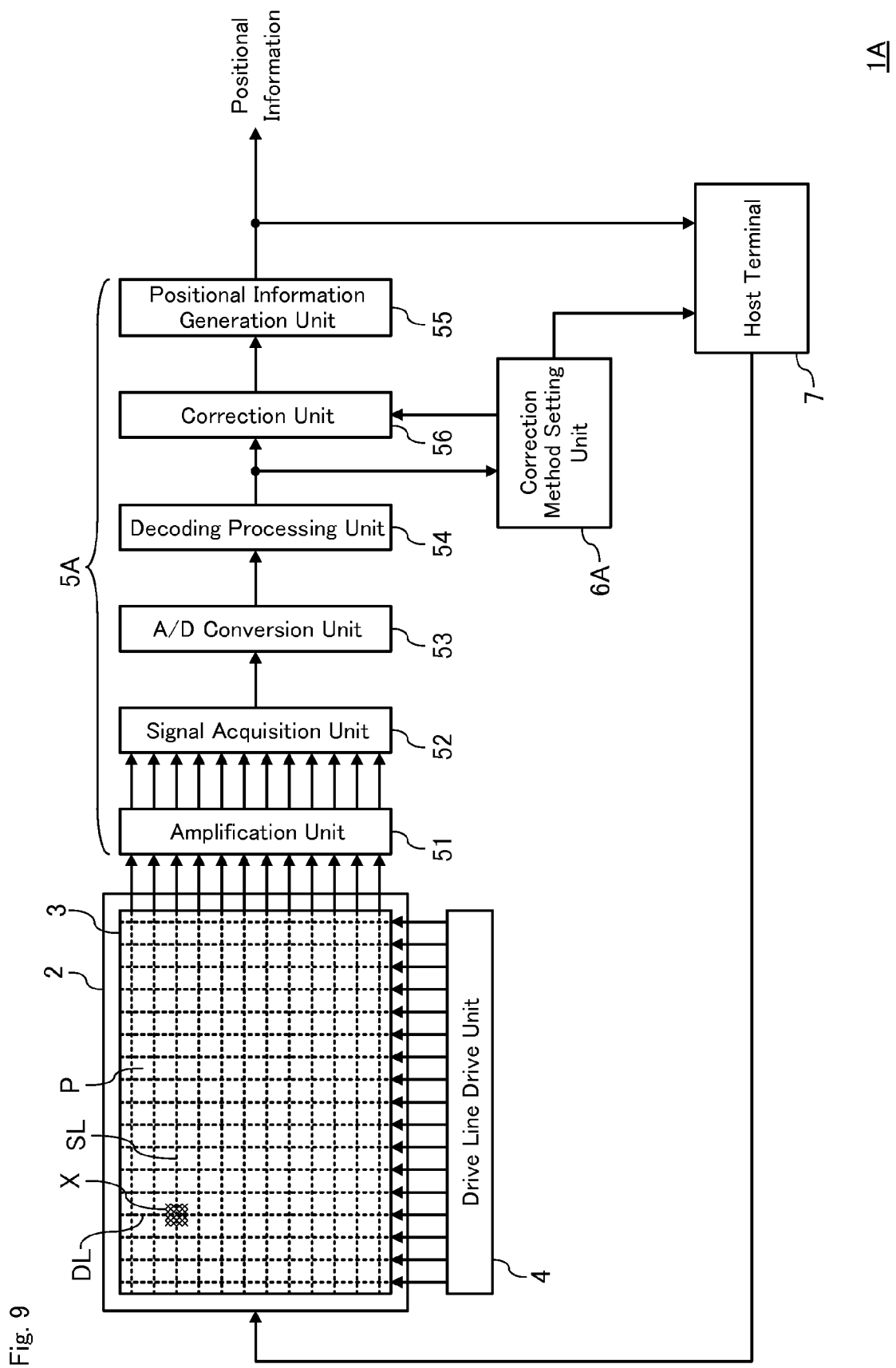
FIG. 9 is a block diagram showing an example of an overall configuration of a touch panel system according to a second embodiment of the present invention.

First, an example of an overall configuration of the touch panel system according to the second embodiment of the present invention will be described with reference to the drawing. FIG. 9 is a block diagram showing the example of the overall configuration of the touch panel system according to the second embodiment of the present invention.

As shown in FIG. 9, a touch panel system 1A according to the second embodiment of the present invention includes the display device 2, the touch panel 3, an indicator position detection unit 5A, a correction method setting unit 6A, and the host terminal 7. That is, the touch panel system 1A according to the second embodiment of the present invention is different from the foregoing touch panel system 1 according to the first embodiment, in including the indicator position detection unit 5A different from the indicator position detection unit 5 included in the forgoing touch panel system 1 according to the first embodiment, and including the correction method setting unit 6A (detection sensitivity correction method setting unit) in place of the detection reference setting unit 6.

The indicator position detection unit 5A is provided with a correction unit 56 in addition to the amplification unit 51, the signal acquisition unit 52, the A/D conversion unit 53, the decoding processing unit 54 and the positional information generation unit 55. The correction unit 56 corrects a capacitance value outputted by the decoding processing unit 54 and inputs the capacitance value after the correction into the positional information generation unit 55. Further, the correction method for the capacitance value in the correction unit 56 is set by the correction method setting unit 6A.

Figure 10:
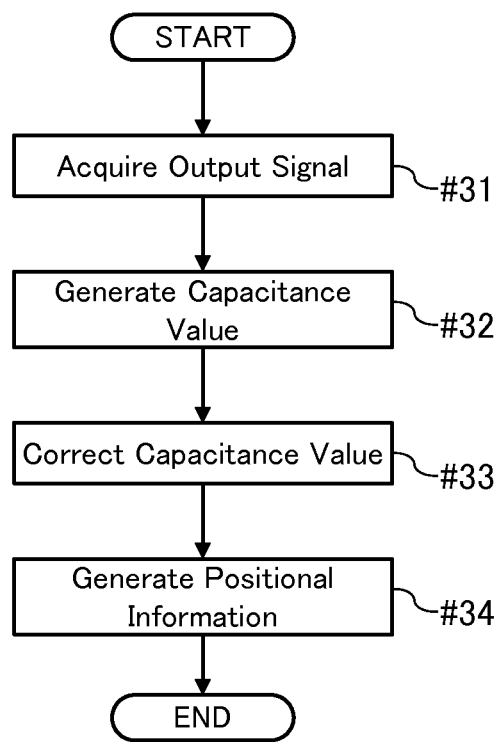
FIG. 10 is a flowchart showing one example of an operation of an indicator position detection unit shown in FIG. 9.

Here, one example of an operation of the indicator position detection unit 5A will be described with reference to the drawing. FIG. 10 is a flowchart showing one example of the operation of the indicator position detection unit shown in FIG. 9.

As shown in FIG. 9, first, the indicator position detection unit 5A acquires an output signal from the sense line SL (Step #31). Next, the indicator position detection unit 5A generates a capacitance value via the amplification unit 51, the signal acquisition unit 52, the A/D conversion unit 53, and the decoding processing unit 54 (Step #32). It is to be noted that the operation up to here is similar to that of the indicator position detection unit 5 included in the foregoing touch panel system 1 according to the first embodiment.

Next, in the indicator position detection unit 5A, the correction unit 56 corrects the capacitance value generated in Step #32 by a correction method set by the correction method setting unit 6A (Step #33). Finally, the positional information generation unit 55 detects the position of the indicator within the detection surface P based on the capacitance value corrected in Step #33 and generates positional information (Step #34).

Figure 11A:
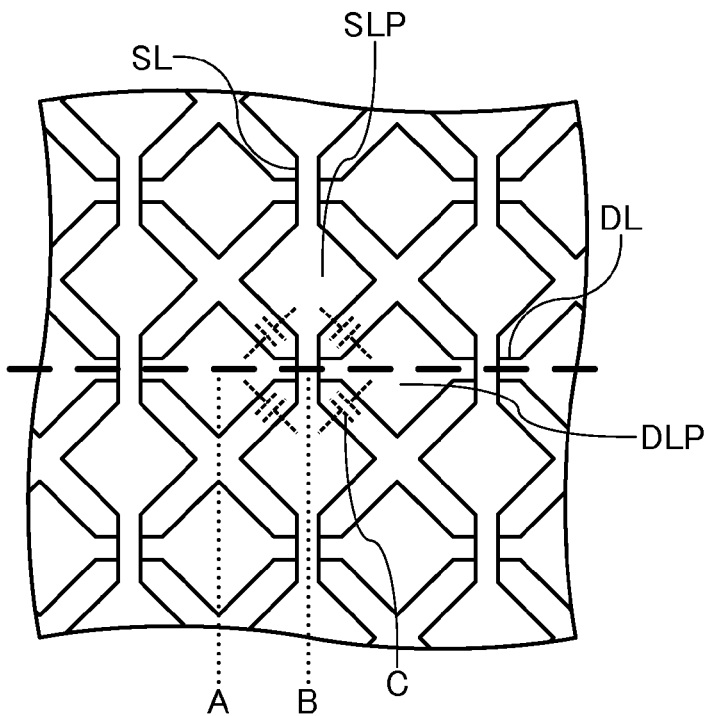
FIG. 11A is a view showing a specific example of a pattern of electrodes and FIGS. 11B and 11C are diagrams each showing a specific example of a correction method for a capacitance value.
Figure 11B:
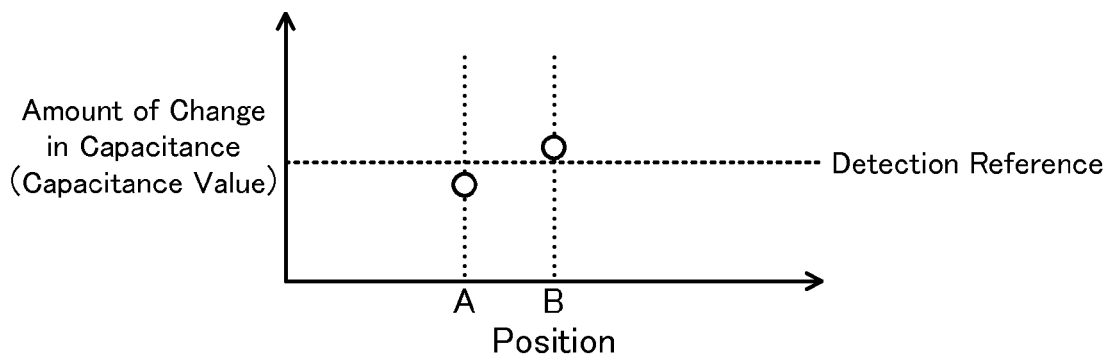
Figure 11C:
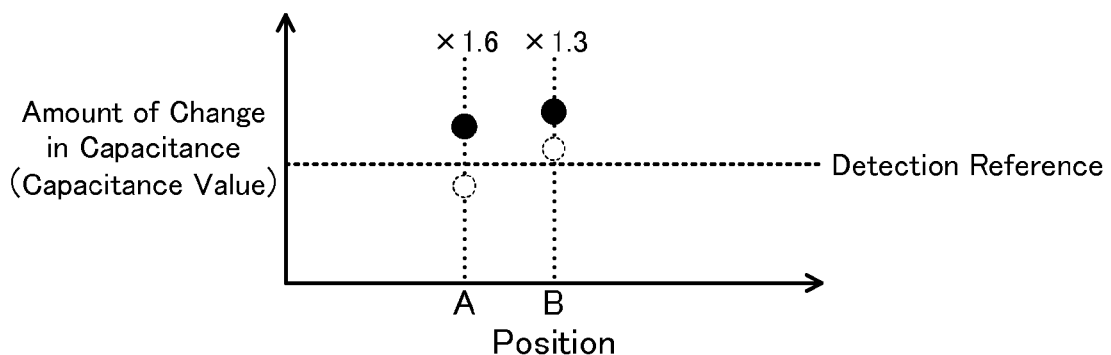

Here, with reference to the drawing, a description will be given of one example of the correction method for the capacitance value by the correction unit 56 and the correction method setting unit 6A. FIG. 11A is a view showing a specific example of a pattern of electrode and FIGS. 11B and 11C are diagrams each showing a specific example of a correction method for a capacitance value. FIG. 11A is a plan view showing the specific example of the pattern of the electrodes. Further, FIG. 11B is a graph displaying the capacitance value and the detection reference together in the case of not correcting the capacitance value. Moreover, FIG. 11C is a graph displaying the capacitance value and the detection reference together in the case of correcting the capacitance value. It is to be noted that FIG. 11A is a view showing the same pattern of the electrodes as that of FIG. 2A. Further, FIGS. 11B and 11C are graphs displayed in a similar manner in FIGS. 2B and 2C, and show the capacitance value and the detection reference at each of the position A and the position B shown in FIG. 11A. Further, the position A and the position B in FIGS. 11A to 11C are the same positions as the position A and the position B in FIGS. 2A to 2C. Moreover, as in FIGS. 2A to 2C, it is also assumed in the examples shown in FIGS. 11A to 11C that the indicator is in contact with each of the position A and the position B.

In the present example, the correction method setting unit 6A sets a capacitance value correction coefficient for each predetermined position within the detection surface P. Then, the correction unit 56 multiplies the capacitance value at each predetermined position within the detection surface P by the corresponding capacitance value correction coefficient, to correct the capacitance value. Specifically, in the present example, a capacitance value correction coefficient of "1.6" is set for the position A, and a capacitance value correction coefficient of "1.3" is set for the position B.

As illustrated with all-white circles in FIG. 11B, when the capacitance value is not corrected, it exceeds the detection reference at the position B, but it falls below the detection reference at the position A. At this time, by correcting the capacitance value at each position, it is possible to make the capacitance value after the correction exceed the detection reference both at the position A and the position B as illustrated with all-black circles in FIG. 11C.

As does the foregoing touch panel system 1 according to the first embodiment, the touch panel system 1A according to the second embodiment of the present invention also corrects the detection sensitivity. However, the touch panel system 1A according to the second embodiment corrects the detection sensitivity by correcting and varying the capacitance value.

As described above, in the touch panel system 1A according to the second embodiment of the present invention, it is possible to detect the indicator that is in contact with or close to the detection surface P at any position within the detection surface P by correcting the capacitance value by an appropriate correction method in accordance with that position (i.e., as appropriate detection sensitivity). This allows improvement in indicator detection accuracy.

It should be noted that as for the setting method for the correction method for the capacitance value (capacitance value correction coefficient) in the correction method setting unit 6A, a similar method to the setting method for the detection reference in the foregoing touch panel system 1 according to the first embodiment (cf. FIGS. 3 to 5) can be adopted.

Further, at the time of the correction unit 56 correcting the capacitance value, a circumjacent capacitance value may be used. Specifically, based on a capacitance value corresponding to a certain position within the detection surface P and a capacitance value corresponding to at least one position around the certain position, the correction unit 56 may correct the capacitance value corresponding to the certain position.

With such a configuration formed, it is possible to correct the capacitance value in consideration of the state of a circumjacent capacitance value. This allows further improvement in indicator detection accuracy.

Further, the touch panel system 1A according to the second embodiment of the present invention is not contrary to the foregoing touch panel system 1 according to the first embodiment, but can also be combined therewith and then implemented. That is, the touch panel system may be formed of both the detection reference setting unit 6 and the correction unit 56/correction method setting unit 6A.

Third Embodiment

Figure 12:
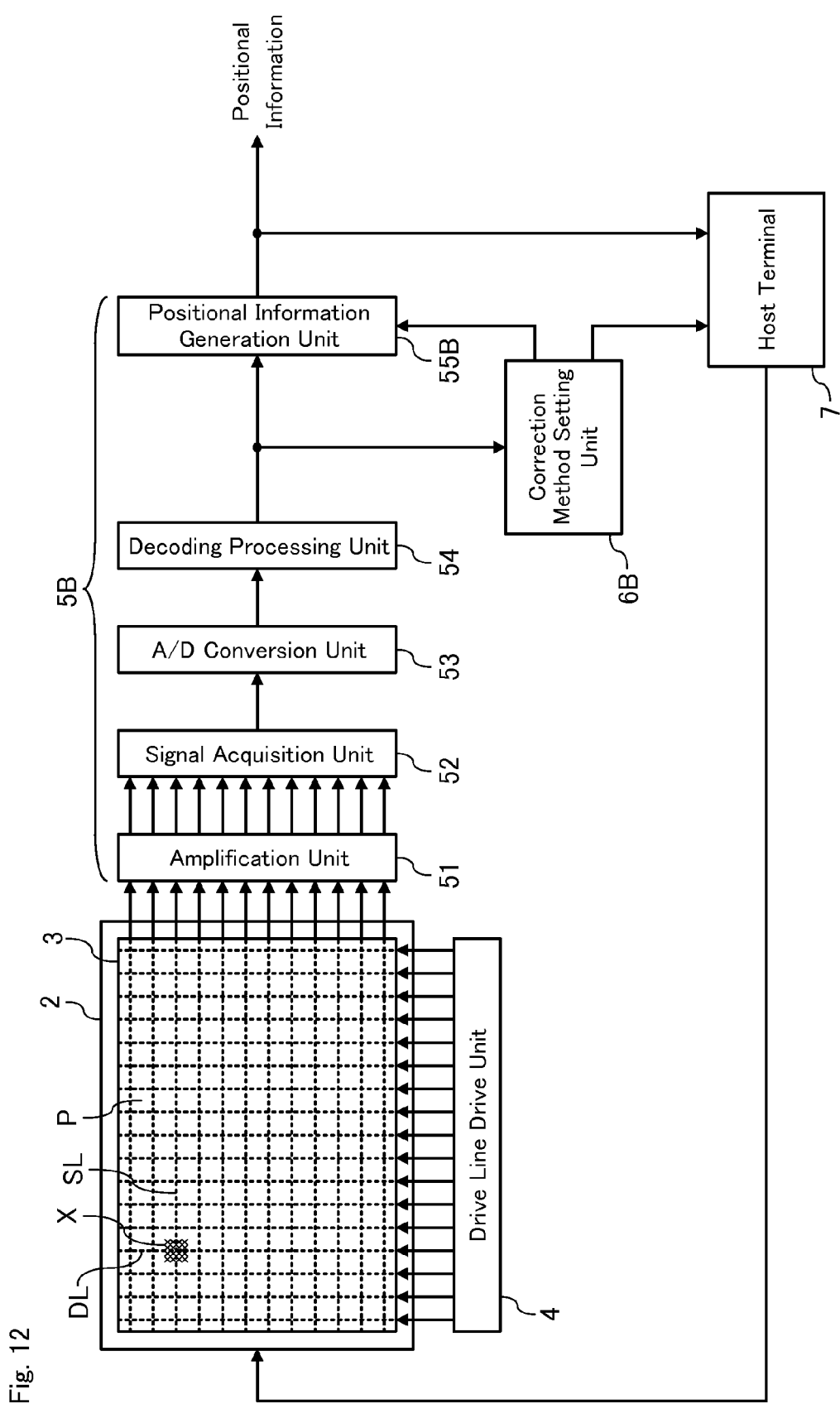
FIG. 12 is a block diagram showing an example of an overall configuration of a touch panel system according to a third embodiment of the present invention.

First, an example of an overall configuration of the touch panel system according to the third embodiment of the present invention will be described with reference to the drawing. FIG. 12 is a block diagram showing the example of the overall configuration of the touch panel system according to the third embodiment of the present invention.

As shown in FIG. 12, a touch panel system 1B according to the third embodiment of the present invention includes the display device 2, the touch panel 3, an indicator position detection unit 5B, a correction method setting unit 6B, and the host terminal 7. That is, the touch panel system 1B according to the third embodiment of the present invention is different from the foregoing touch panel system 1 according to the first embodiment, in including the indicator position detection unit 5B different from the indicator position detection unit 5 included in the foregoing touch panel system 1 according to the first embodiment, and including the correction method setting unit 6B (detection sensitivity correction method setting unit) in place of the detection reference setting unit 6.

As is the foregoing touch panel system 1 according to the first embodiment, the indicator position detection unit 5B is provided with the amplification unit 51, the signal acquisition unit 52, the A/D conversion unit 53, the decoding processing unit 54, and a positional information generation unit 55B. However, the positional information generation unit 55B detects the position of the indicator within the detection surface P by use of the detection reference corrected by a correction method set by the correction method setting unit 6B.

Figure 13:
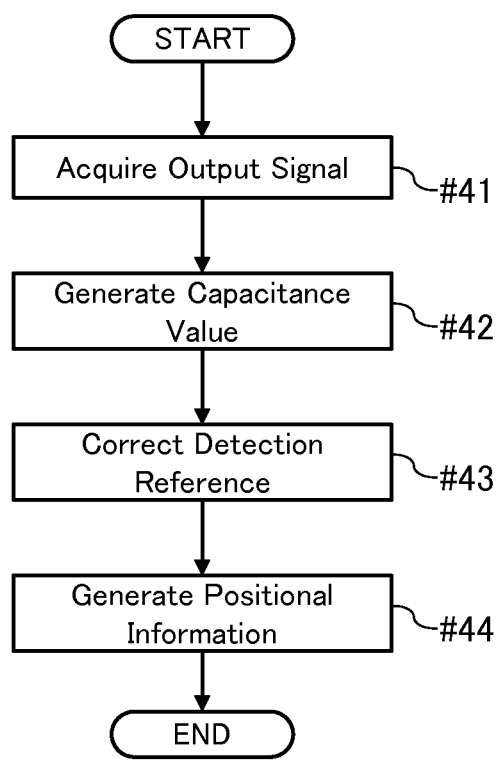
FIG. 13 is a flowchart showing one example of an operation of an indicator position detection unit shown in FIG. 12.

Here, one example of an operation of the indicator position detection unit 5B will be described with reference to the drawing. FIG. 13 is a flowchart showing one example of the operation of the indicator position detection unit shown in FIG. 12.

As shown in FIG. 13, first, the indicator position detection unit 5B acquires an output signal from the sense line SL (Step #41). Next, the indicator position detection unit 5B generates a capacitance value via the amplification unit 51, the signal acquisition unit 52, the A/D conversion unit 53, and the decoding processing unit 54 (Step #42). It is to be noted that the operation up to here is similar to that of the indicator position detection unit 5 included in the foregoing touch panel system 1 according to the first embodiment.

Next, in the indicator position detection unit 5B, the positional information generation unit 55B corrects the detection reference by a correction method set by the correction method setting unit 6B (Step #43). Finally, the positional information generation unit 55B detects the position of the indicator within the detection surface P by use of the detection reference corrected in Step #43 (Step #44).

Figure 14A:
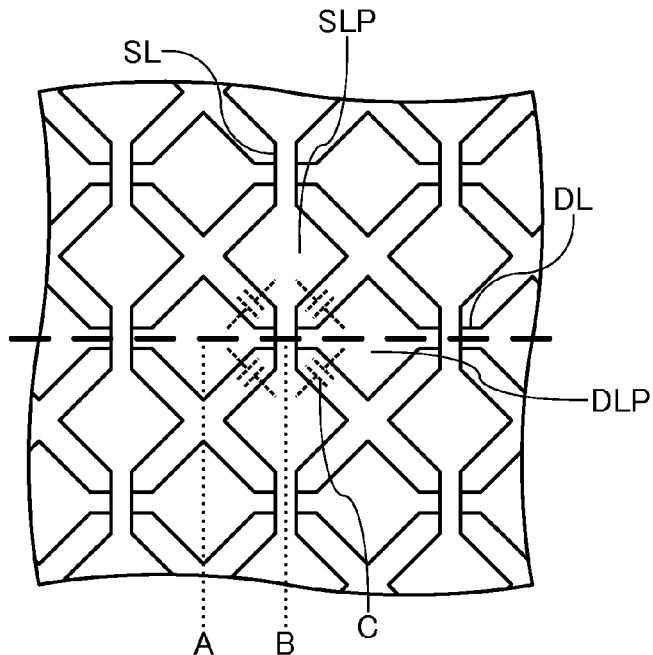
FIG. 14A is a view showing a specific example of a pattern of electrodes and FIGS. 14B and 14C are diagrams each showing a specific example of a correction method for a detection reference.
Figure 14B:
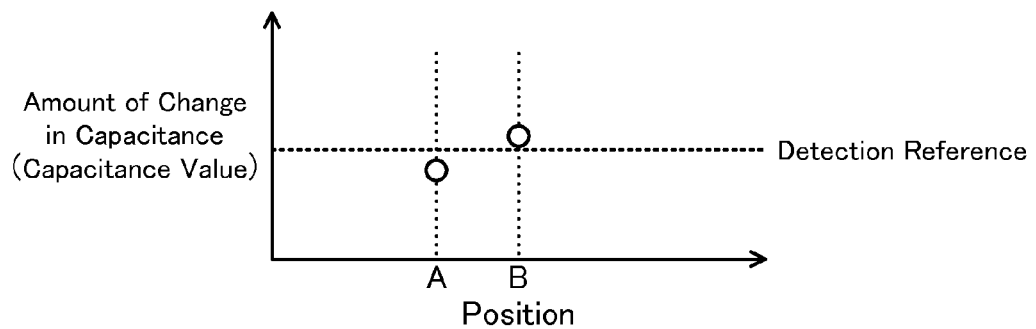
Figure 14C:
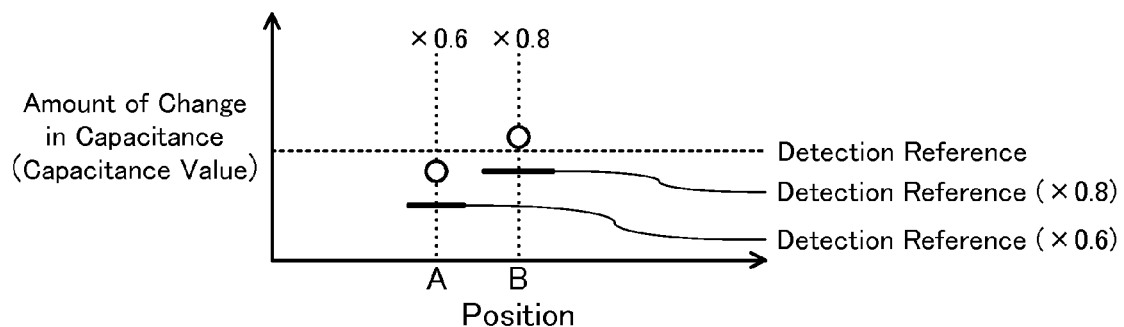

Here, with reference to the drawing, a description will be given of one example of the correction method for the detection reference by the positional information generation unit 55B and the correction method setting unit 6B. FIG. 14A is a view showing a specific example of a pattern of electrodes and FIGS. 14B and 14C are diagrams each showing a specific example of a correction method for a detection reference. FIG. 14A is a plan view showing a specific example of the pattern of the electrodes. Further, FIG. 14B is a graph displaying the capacitance value and the detection reference together in the case of not correcting the detection reference. Moreover, FIG. 14C is a graph displaying the capacitance value and the detection reference together in the case of correcting the detection reference. It is to be noted that FIG. 14A is a view showing the same pattern of the electrodes as that of FIG. 2A. Further, FIGS. 14B and 14C are graphs displayed in a similar manner in FIGS. 2B and 2C, and show the capacitance value and the detection reference at each of the position A and the position B shown in FIG. 14A. Further, the position A and the position B in FIGS. 14A to 14C are the same positions as the position A and the position B in FIGS. 2A to 2C. Moreover, as in FIGS. 2A to 2C, it is also assumed in the examples shown in FIGS. 14A to 14C that the indicator is in contact with each of the position A and the position B.

In the present example, the correction method setting unit 6B sets a detection reference correction coefficient for each predetermined position within the detection surface P. Then, the positional information generation unit 55B multiplies the detection reference set for each predetermined position within the detection surface P by the corresponding detection reference correction coefficient, to correct the detection reference. Specifically, in the present example, a detection reference correction coefficient of "0.6" is set for the position A, and a detection reference correction coefficient of "0.8" is set for the position B.

As illustrated with broken line in FIG. 14B, when the detection reference is not corrected, the capacitance value exceeds the detection reference at the position B, but the capacitance value falls below the detection reference at the position A. At this time, by correcting the detection reference at each position, it is possible to make the capacitance value exceed the detection reference after the correction both at the position A and the position B, as illustrated with thick solid lines in FIG. 14C.

As does the foregoing touch panel system 1 according to the first embodiment, the touch panel system 1B according to the third embodiment of the present invention also corrects the detection sensitivity. However, the touch panel system 1B according to the third embodiment corrects the detection sensitivity by correcting and varying the detection reference.

As described above, in the touch panel system 1B according to the third embodiment of the present invention, it is possible to detect the indicator that is in contact with or close to the detection surface P at any position within the detection surface P by correcting the detection reference by an appropriate correction method in accordance with that position (i.e., as appropriate detection sensitivity). This allows improvement in indicator detection accuracy.

It should be noted that as for the setting method for the correction method for the detection reference (detection reference correction coefficient) in the correction method setting unit 6B, a similar method to the setting method for the detection reference in the foregoing touch panel system 1 according to the first embodiment (cf. FIGS. 3 to 5) can be adopted.

Further, the touch panel system 1B according to the third embodiment of the present invention is not contrary to the foregoing touch panel system 1 according to the first embodiment and the touch panel system 1A according to the second embodiment of the present invention, but can also be combined therewith and then implemented. That is, in addition to the correction method setting unit 6B, the touch panel system may be formed of at least one of the detection reference setting unit 6 and the correction unit 56/correction method setting unit 6A.

<Modification, Etc.>

In the foregoing touch panel systems 1A, 1B according to the second and third embodiments of the present invention, the capacitance value is taken as the amount of change in capacitance (i.e., a difference between the capacitance at the time of non-contact of the indicator and the capacitance at the time of performing detection) at each predetermined position within the detection surface P, but a value other than this may also be taken so. For example, the capacitance at each predetermined position within the detection surface P may be taken as the capacitance value. However, the capacitance value is preferably taken as the amount of change in capacitance at each predetermined position within the detection surface P, since it is possible to suppress reflection of the non-uniformity of the characteristics of the touch panel 3 to the capacitance value.

<<Summary>>

The touch panel systems 1, 1A, 1B according to the first to third embodiments of the present invention and the electronic information devices 100 including the touch panel systems 1, 1A, 1B can be grasped as follows, for example.

A touch panel system 1, 1A or 1B according to the embodiment of the present invention includes: a touch panel 3 provided with a plurality of electrodes SL, DL; and an indicator position detection unit 5, 5A or 5B for detecting a position of the indicator that is in contact with or close to the detection surface P, based on an output signal that is outputted by at least part of the electrodes SL, DL and shows a capacitance formed by the electrode SL, wherein the indicator position detection unit 5, 5A or 5B corrects detection sensitivity for each predetermined position within the detection surface P so as to correspond to a pattern of electrodes SL, DL, and detects the position of the indicator within the detection surface P.

According to the above touch panel systems 1, 1A, 1B, it is possible to detect the indicator that is in contact with or close to the detection surface P at any position within the detection surface P by means of appropriate detection sensitivity in accordance with that position. This allows improvement in indicator detection accuracy.

It is to be noted that correcting the detection sensitivity means varying a relative relation between a detection reference and a signal value as an object to which the detection reference is applied (e.g., an amount of change in capacitance or a capacitance value). Specifically, for example, one or both of varying the detection reference and varying the signal value are included in the correction of the detection sensitivity.

Further, in the above touch panel system 1, the position of the indicator within the detection surface P is detected by use of a detection reference that is set for each predetermined position within the detection surface P so as to correspond to the pattern of electrodes SL, DL.

Further, in the above touch panel system 1A, the indicator position detection unit 5A detects the position of the indicator within the detection surface P based on a capacitance value that is obtained by processing the output signal and corresponds to the capacitance at each predetermined position within the detection surface P, and the indicator position detection unit 5A corrects the capacitance value by a correction method set for each predetermined position within the detection surface P so as to correspond to the pattern of electrodes SL, DL, and detects the position of the indicator within the detection surface P based on the obtained capacitance value after correction.

Further, in the above touch panel system 1A, the indicator position detection unit 5A corrects the capacitance value corresponding to a certain position within the detection surface P based on the capacitance value corresponding to the certain position and the capacitance value corresponding to at least one position around the certain position.

According to the above touch panel system 1A, it is possible to correct the capacitance value in consideration of the state of a circumjacent capacitance value. This allows further improvement in indicator detection accuracy.

Further, in the above touch panel system 1B, the indicator position detection unit 5B corrects the detection reference by a correction method set for each predetermined position within the detection surface P so as to correspond to the pattern of electrodes SL, DL, and detects the position of the indicator within the detection surface P by use of the detection reference after the correction.

Further, in the touch panel system 1, 1A or 1B, the touch panel 3 includes, as the electrodes SL, DL, a plurality of lower electrodes DL that are provided so as to be parallel to each other along the detection surface P, and a plurality of upper electrodes SL that intersect with the lower electrodes DL between the detection surface P and the lower electrodes DL and are provided so as to be parallel to each other along the detection surface P, and within the detection surface P, the detection sensitivity is corrected such that the indicator is easier to be detected at a position more apart from a center line of the upper electrode SL.

According to the above touch panel system 1, 1A or 1B, it is possible to set the detection sensitivity that facilitates detection of the indicator at a position being apart from a position immediately above the upper electrode SL within the detection surface P where detection of the indicator is difficult.

Further, in the above touch panel system 1, 1A or 1B, the indicator position detection unit 5, 5A or 5B compares the capacitance found from the output signal obtained in a state where the indicator that is in contact with or close to the detection surface P is not present and the capacitance found from the output signal that is obtained at the time of detecting the position of the indicator within the detection surface P, to find distribution of an amount of change in the capacitance (capacitance value), and detects the centroidal position of the distribution of the amount of change in the capacitance as the position of the indicator within the detection surface P when the amount of change in the capacitance at the centroidal position is larger than the detection reference, and within the detection surface P, the smaller detection reference is set at a position more apart from the center line of the upper electrode SL.

Further, in the above touch panel system 1, 1A or 1B, the correction method for the detection sensitivity is set based on a result of processing on the output signal obtained at the time of the indicator actually coming into contact with the detection surface P.

According to the above touch panel systems 1, 1A, 1B, it is possible to accurately find and set the correction method for the detection sensitivity corresponding to the pattern of electrodes SL, DL.

Further, the touch panel system 1, 1A or 1B further includes: a display device 2 for displaying an image; and a host terminal 7 for controlling an image displayed by the display device 2, and the touch panel 3 is provided on a display surface of the display device 2 where the image is displayed, the host terminal 7 controls the image displayed on the display device 2, to guide the indicator to come into contact with a predetermined position within the detection surface P, and based on the obtained output signal, a correction method for the detection sensitivity is found.

According to the above touch panel systems 1, 1A, 1B, it is possible to promptly acquire an output signal necessary for setting the correction method for the detection sensitivity by guiding the user.

Further, in the above touch panel system 1, 1A or 1B, the correction method for the detection sensitivity is set based on a characteristic of the pattern of electrodes SL, DL.

According to the above touch panel systems 1, 1A, 1B, it is possible to readily find and set the correction method for the detection sensitivity corresponding to the pattern of electrodes SL, DL.

Further, the above touch panel system 1, 1A or 1B further includes a detection sensitivity correction method setting unit 6, 6A or 6B for setting or updating the correction method for the detection sensitivity based on a result of processing on the output signal by the indicator position detection unit 5, 5A or 5B.

According to the above touch panel systems 1, 1A, 1B, it is possible to set the correction method for the detection sensitivity at arbitrary timing such as the time before shipment of the touch panel system 1 or the time of the user using the touch panel system 1, 1A or 1B.

Further, in the above touch panel system 1, 1A or 1B, the electrodes SL, DL are made of a pattern formed by linearly connecting a plurality of polygonal or circular pad units.

Further, the above touch panel system 1, 1A or 1B further includes a display device 2 for displaying an image, and the touch panel 3 is provided on the display surface of the display device 2 where the image is displayed.

Further, in the above touch panel system 1, 1A or 1B, the display device 2 is a liquid crystal display, a plasma display, an organic EL display or a field emission display.

Further, the electronic information device 100 according to the embodiment of the present invention is provided with the above touch panel system 1, 1A or 1B.

INDUSTRIAL APPLICABILITY

The touch panel system according to the present invention is preferably applicable to a projection type capacitive touch panel system, and the like, for example.

DESCRIPTION OF SYMBOLS 1 touch panel system
2 display device
3 touch panel
4 drive line drive unit
5, 5A, 5B indicator position detection unit
51 amplification unit
52 signal acquisition unit
53 A/D conversion unit
54 decoding processing unit
55, 55B positional information generation unit
56 correction unit
6 detection reference setting unit (detection sensitivity correction method setting unit)
6A correction method setting unit (detection sensitivity correction method setting unit)
6B correction method setting unit (detection sensitivity correction method setting unit)
7 host terminal
100 electronic information device
DL drive line
DLP drive line pad unit
SL sense line
SLP sense line pad unit
P detection surface
X detection region

The invention claimed is:

1. A touch panel system comprising:
a touch panel provided with a plurality of drive lines that are provided so as to be parallel to each other along a detection surface and a plurality of sense lines that intersect with the drive lines and are provided so as to be parallel to each other along the detection surface; and
an indicator position detection unit for finding capacitances formed between the drive lines and the sense lines for respective combinations of the drive lines and sense lines, based on an output signal that is outputted by the sense lines when a predetermined signal is applied to the drive lines, and detecting a position of an indicator that is in contact with or close to the detection surface, based on two-dimensional distribution of the capacitances within the detection surface,
wherein the indicator position detection unit calculates a capacitance value corresponding to each of the capacitances for respective predetermined minute positions whose interval is shorter than an interval of intersections of the drive lines and the sense lines within the detection surface, and detects the position of the indicator within the detection surface by comparing the capacitance value with a detection reference,
wherein the indicator position detection unit performs one or both of a first process for correcting the capacitance value by a correction method set for each of the predetermined minute positions so as to correspond to a pattern of the drive lines and the sense lines, and a second process for detecting the position of the indicator within the detection surface by use of the detection reference set for each of the minute positions so as to correspond to the pattern of the drive lines and the sense lines,
wherein the sense lines are provided between the detection surface and the drive lines, and
wherein each of the first and second processes makes the indicator to be detected at a position more apart from a center line of a sense line closest to the indicator within the detection surface.

2. The touch panel system according to claim 1, wherein the indicator position detection unit performs the second process.

3. The touch panel system according to claim 2, wherein the indicator position detection unit corrects the detection reference by a correction method set for each of the minute positions so as to correspond to the pattern of the drive lines and the sense lines, and detects the position of the indicator within the detection surface by use of the detection reference after the correction.

4. The touch panel system according to claim 1, wherein the indicator position detection unit performs the first process.

5. The touch panel system according to claim 4, wherein the indicator position detection unit corrects the capacitance value corresponding to a certain position within the detection surface, based on the capacitance value corresponding to the certain position and the capacitance value corresponding to at least one position around the certain position.

6. The touch panel system according to claim 1, wherein a correction method for the capacitance value and the detection reference are set based on a result of processing on the output signal obtained at the time of the indicator actually coming into contact with the detection surface.

7. The touch panel system according to claim 1, wherein a correction method for the capacitance value and the detection reference are set based on a characteristic of the pattern of the drive lines and the sense lines.

8. The touch panel system according to claim 1, further comprising:

a detection sensitivity correction method setting unit for setting or updating a correction method for the capacitance value and the detection reference based on a result of processing on the output signal by the indicator position detection unit.

9. The touch panel system according to claim 1, wherein the first process sets a correction coefficient by which the capacitance value at the minute position more apart from a center line of the closest sense line is to be multiplied to be larger than a correction coefficient by which the capacitance value at the minute position closer to the center line of the closest sense line is to be multiplied, and the second process sets the detection reference at the minute position more apart from the center line of the closest sense line to be lower than the detection reference at the minute position closer to the center line of the closest sense line.

* * * * *